May 30, 1967
L. G. KILMER
3,322,228
METHOD OF IMPROVING THE IMPULSE CHARACTERISTICS
OF SEISMIC GAS EXPLODERS
Filed May 8, 1964
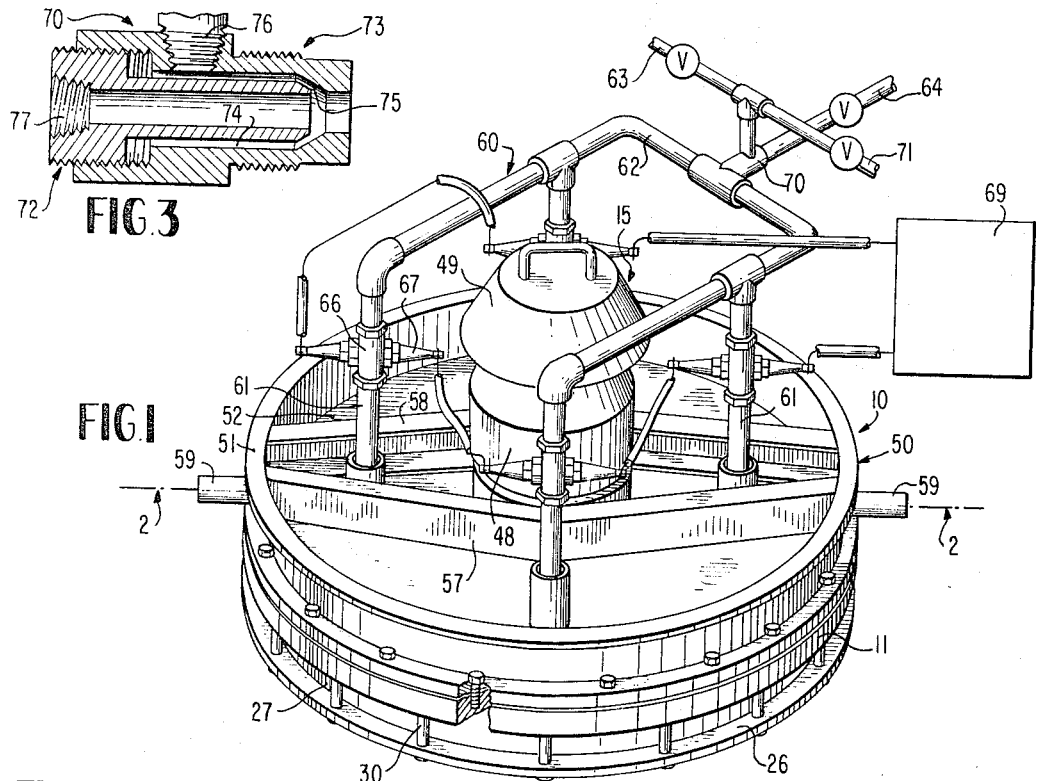
FIG.3
FIG.1
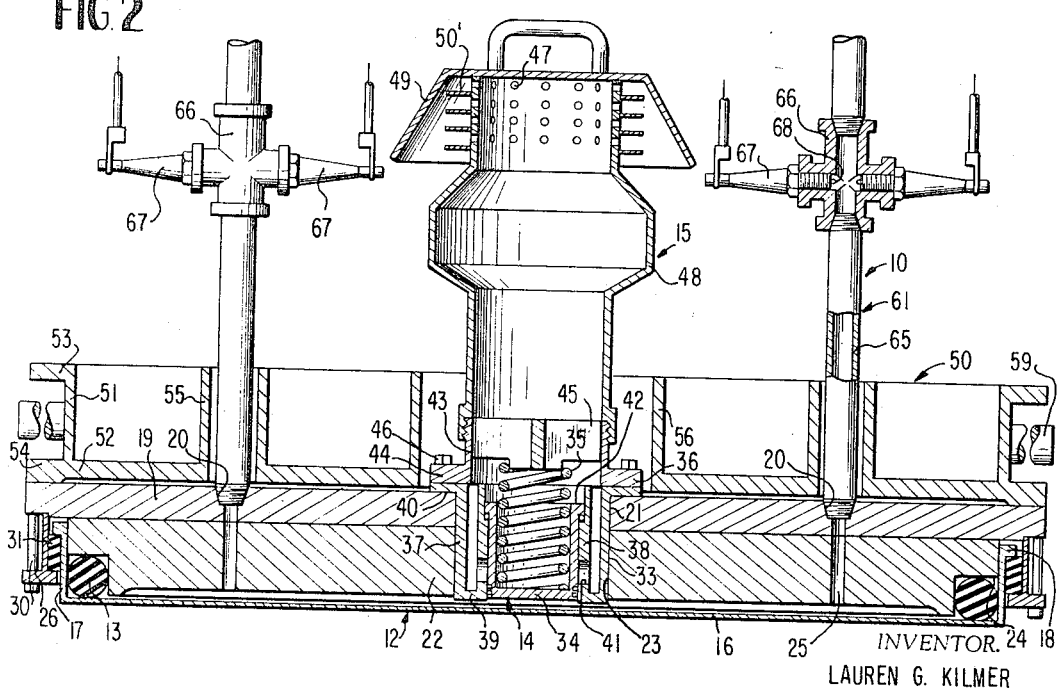
FIG.2
INVENTOR.
LAUREN G. KILMER
BY
ATTORNEY United States Patent Office 3,322,228
Patented May 30, 1967

3,322,228
METHOD OF IMPROVING THE IMPULSE CHARACTERISTICS OF SEISMIC GAS EXPLODERS
Lauren G. Kilmer, Tulsa, Okla., assignor to Sinclair Research, Inc., New York, N.Y., a corporation of Delaware
Filed May 8, 1964, Ser. No. 366,094
7 Claims. (Cl. 181—.5)

My invention relates to geophysical prospecting using a device for imparting a compressive impulse at the earth's surface by an explosion and more particularly to a method and composition for improving the impulse characteristics of such devices.

As described in my co-pending applications Serial No. 187,111, filed April 12, 1962, now Patent No. 3,235,027, and Serial No. 314,230, filed October 7, 1963, a gas explosion confined in an expansible chamber acting at the earth-air interface against a large mass positioned above such gas explosion can be utilized to impart a compressive impulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the impulse imparted to the surface of the earth has a high energy content and can be made of extremely short duration. The useful energy imparted to the earth in such a device is derived from the heat of the reaction, i.e. explosion, in combination with the shock of detonation and occurs at the moment of the explosion before there is any significant upward movement of the top of the device occurring as a result of the explosion.

I have now surprisingly discovered that the efficiency of my gas exploder may be increased by making the explosion occur faster and hence take more advantage of the inertia mass in the top weight. Specifically, I contemplate in accordance with my invention the addition of small amounts of hydrogen to the fuel gas-oxygen explosive charge supplied to the expoder device to improve the efficiency of the exploder device by making the explosion occur at a faster rate. This faster rate not only takes more advantage of the inertia mass in the top weight, but also increases the compressional wave which is transmitted to the ground by creating a higher pressure pulse in the chamber. Furthermore, the addition of hydrogen to the fuel-oxygen charge broadens the frequency spectrum of the compressional wave by generating more high frequency waves in the exploder pulse. Additionally, the faster reaction rate decreases the reaction on the top weight and mass supported by the gas exploder device since the movement of the device can be largely absorbed by conventional means so that smaller amounts of force are transmitted to the top weight.

In general, hydrogen is added to the fuel gas-oxygen charge which is burned in the explosion chamber in an amount sufficient to accelerate the rate of the explosion but insufficient to create a significant loss in the total heat of reaction. Since the compressional wave of the gas exploder is produced by a combination of the heat of reaction and the shock of the detonation, but mainly from the heat of the reaction, any substantial loss or reduction in the heat of reaction would directly affect the compressional wave generated. Such amounts range generally from about 2% by volume and up to about 15% hydrogen, based on the volume of oxygen present in the explosive charge, and more particularly, from about 3 to 4% by volume to about 10% based on the volume of oxygen in the explosive charge.

The fuel gas-oxygen explosive charges may comprise oxygen and any fuel gas, e.g. hydrocarbon or petroleum-derived, fuel gas, which may be detonated with a sufficient rate of reaction to produce a compressional wave such as methane, ethane, ethylene, propane, propylene, butane, etc., and mixtures thereof. The fuel gas is usually mixed with oxygen in approximately stoichiometric amounts or a slight excess of oxygen is used to provide a good impulse from the explosion although from about ½ mol excess fuel gas to ½ mol excess oxygen, relative to stoichiometric amounts, may be present in the fuel mixture. For example, a 4.5:1 ratio of oxygen to propylene may be used.

I am aware that attempts have been made in the past to use hydrogen as the fuel gas in a hydrogen-oxygen explosive charge. Hydrogen is not, however, a satisfactory fuel gas in an impulse generator which is a surface source since the impulse or compressional wave produced thereby is small when used alone in combination with oxygen. While the detonation rate of a mixture of hydrogen and oxygen is fast, the heat content of the reaction is so low that very little expansion occurs in the closed chamber to compress the ground for wave transmission. In my invention, however, it is theorized that in contrast to the prior art, since the amount of heat to be derived from the small amount of hydrogen present is not significant in the power of the pulse, the additional impulse derived from the hydrogen used in accordance with my invention is from the increased speed of reaction experienced when hydrogen is mixed with a fuel gas-oxygen explosive charge.

Hydrogen is injected into the explosive fuel gas-oxygen mixture prior to the point at which the gas mixture is injected into the combustion chamber and sufficiently upstream from the combustion chamber for the hydrogen-fuel gas-oxygen mixture to be thoroughly mixed prior to introduction into the chamber. The hydrogen and fuel gas streams, for example, may be mixed to form a single stream which is then passed through an injector mixer nozzle which combines the hydrogen-fuel gas stream with an oxygen stream. A satisfactory injector can be formed by placing an oxygen injector nozzle inside a chamber and forming an annular chamber around the nozzle. The hydrogen-fuel gas stream can be injected through the annulus formed around the oxygen nozzle and an oxygen stream can be injected through the oxygen nozzle. The large volume of the flowing oxygen gas stream will pull the hydrogen-fuel gas through the mixer and the turbulence created at the annulus will cause an intense mixing of the gases.

For a more complete understanding of the practical application of my invention reference is made to the appended drawings in which:

FIGURE 1 is an isometric view of a gas exploder in which the fuel gas-oxygen charge of my present invention can be used;

FIGURE 2 is a vertical section taken at line 2—2 in FIGURE 1;

FIGURE 3 is an enlarged sectional view of the mixing device as seen in FIGURE 2.

Referring more particularly to FIGURES 1 and 2 the reference number 10 designates a gas exploder constructed in accordance with my present invention. Gas exploder 10 basically includes a top 11, a bottom 12, a sealing ring 13, a valve 14 and an exhaust stack 15.

Bottom 12 includes a circular steel plate 16 which at its rim is provided with an integral, upstanding cylindrical flange 17 which at its upper end carries an integral, outwardly-extending, short, annular flange 18.

Top 11 includes an annular, thick-steel plate 19 having an outside diameter slightly larger than the outside diameter of flange 18 and is further provided with four small, tapped, vertical openings 20 disposed at 90° intervals about plate 19 approximately midway between its central opening 21 and its rim. Plate 19 carries a depending, coaxially positioned, generally annular, iron casting 22 which is welded to the underside of plate 19. Casting 22 is approximately of the same height as flange 17 on bottom plate 16 and has an outside diameter slightly less than that of flange 17 such that top plate 19 can be positioned coaxially over bottom plate 16 with casting 22 inside flange 17 and spaced slightly inward of flange 17.

Casting 22 has an open center 23 approximately the same diameter as opening 21 and is stepped inwardly at its lower, outer edge to form an annular seat 24 sized to receive O-ring 13. Casting 22 is further provided with four vertical passages 25 which are dispersed at 90° intervals about casting 22 and are positioned such that they coincide in location with tapped openings 20 in plate 19 with which they register.

It will be noted that sealing ring 13, which is made of chloroprene rubber, is positioned resting on the top of bottom plate 16 just inside flange 17 such that seat 24 rests on it. Preferably the thickness of ring 13 is sufficient that the bottom of casting 22 slightly clears the top of bottom plate 16 and the sides of ring 13 are just tangent to the side of casting 22 below seat 24 and the inner side of flange 17.

Bottom 11 and top 12 are retained together by means of a hoop 26 positioned encircling flanges 17 and 18. Hoop 26 has the cross-section of an inverted T, and is secured to the underside of the rim of plate 19 by means of a series of cap bolts 30 which extend upwardly through apertures disposed at intervals about the outer annular flange of hoop 26 with their shank ends threadedly received in correspondingly positioned tapped openings in the underside of the rim of plate 19 to hold hoop 26 firmly against the underside of plate 19.

The inside diameter of the cylindrical portion of hoop 26 is sized just to clear flange 18 on bottom 12 such that the inner annular flange at the lower end of hoop 26 is spaced below and underlies flange 18 to receive a strip 31 of hard chloroprene rubber between hoop 26 and flange 17. Rubber strip 31 has cross-sectional dimensions generally filling the space between lower inner flange on hoop 26 and flange 18.

Valve 14 includes a valve body 33, a piston (valve element) 34, a helical spring 35 and a spring retainer cage 36. Generally valve body 33 includes a pair of coaxial cylindrical walls 37 and 38, which are spaced from each other, are closed together at their lower ends by means of an interconnecting annular end wall 39 and are open at their upper ends. The outer sidewall 37 at its upper end is provided with an outwardly extending annular flange 40 and itself has a diameter just less than that of openings 21 and 23 with flange 40 overlying the top of plate 19. Inner wall 38 has a machined inside surface which is counter-sunk at its upper end and which is provided with a series of apertures 41 adjacent its lower end providing communication between the annular space between walls 37 and 38 and the central opening of valve body 33 lying inside wall 38.

Piston 34 is a machined casting sized to fit snugly but slidingly within cylindrical wall 38 and has a flange 42 at its upper end received in the counter bore in the upper end of the interior of wall 38 to limit downward movement of piston 34 at a position in which the lower, closed end of piston 34 is flush with the underside of casting 22 when piston 34 is dropped into the central opening of valve body 33 from its upper ends.

Spring cage 36 is a short steel cylinder 43 which is threaded at its upper end and which has an outwardly projecting, annular flange 44 at its lower end and a pair of intersecting steel cross-plates in its upper interior portion forming a spider 45. The cylindrical portion 43 of spring cage 36 has the same inside diameter as sidewall 37 of valve body 33 and is positioned above valve body 33 with annular flange 44 on spring cage 36 overlying flange 40. Spring cage 36 is retained in such position by a series of cap bolts 46 received in apertures in flanges 40 and 44 which register with correspondingly disposed tapped bores about opening 21 in plate 19 such that helical spring 35 is retained snugly under compression between the underside of spider 45 and the upperside of the closed bottom of piston 34. The spacing of the flights of spring 35 in this position and the length of piston 34 in relation to the location of spider 45 is such that when piston 34 is displaced upwardly to the maximum compression of spring 35, apertures 41 in sidewall 38 are completely exposed to communicate the space confined between bottom 12 and top 11 with the annular space between walls 37 and 38 of valve body 33 and hence with the exterior or exploder 10 through spring cage 36. Muffler 15, which is of any conventional construction providing low-pass characteristics desirably having an upper cut-off frequency on the order of five cycles per second, is threadedly received at its open, lower end on the upper end of cylinder 43 of spring cage 36 and is provided with lateral openings 47 about its upper, closed end to permit venting of gases passing upwardly through valve 14 into muffler 15. Interiorly muffler 15 is hollow, in the illustrated case, and is centrally enlarged as indicated by the reference numeral 48. A frusto-conical deflector skirt 49 is mounted at the upper end of muffler 15 above openings 47 and extends downwardly and outwardly to below the level of openings 47. Optionally openings 47 can be disposed in several rows about the top of muffler 15 underlying deflector skirt 49, and the upper end of muffler 15 can be further provided with external annular baffles 50' positioned within deflector skirt 49 and spaced inwardly therefrom, each such baffle 50' being attached to muffler 15 between an adjacent pair of rows of openings 47.

It will be noted gas exploder 10, as illustrated in FIGURES 1 and 2, is further equipped with a shallow cylindrical tank 50 including, as integral parts, a cylindrical sidewall 51, an annular bottom plate 52, outwardly extending, annular flanges 53 and 54 at the upper and lower ends of sidewall 51 respectively, and four upstanding sleeves 55 having their lower ends disposed in openings in plate 52 registering with openings 20 but having wider diameters than openings 20. In addition the central aperture of plate 52, which is wider than flanges 40 and 44 on valve body 33 and spring cage 36, is also provided with an integral, upstanding sleeve 56 the lower end of which is disposed in such central aperture. Tank 50 is further provided with a pair of slightly bowed braces 57 and 58 which are in juxtaposition with their adjacent end pairs close and welded to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 20 and to valve 14.

Referring to FIGURES 1 and 2 gas exploder 10 further requires a gas charging and ignition system generally designated by the reference number 60. Charging and ignition system 60 basically includes four upstanding conduits 61 interconnected at their upper ends through a header 62 and mixing unit 70 to separate valved connections 63, 64 and 71 leading to storage cylinders respectively for propane or propylene, or other suitable combustible fuel gas; for oxygen; and, for hydrogen.

Each upstanding conduit 61 includes a pipe section 65 threadedly received at its lower end in a tapped aperture 20 in plate 19 and, threadedly received on the upper end of such pipe section 61, a four-way fitting 66. Header 62 generally includes suitable nipples, elbows and tees as well as pipe sections to provide a U-shaped connection communicating the upper openings of four-way fittings 66 with valved conduits 63 and 64 which are preferably connected to the bottom of the U.

Eight spark plugs 67 having their ground electrodes removed are connected, two to each four-way fitting 66, in the lateral openings of fittings 66 such that, as shown most clearly in FIGURE 2, the insulated electrodes 68 of each thusly associated pair of plugs 67 face each other in such fitting 66. Exteriorly eight spark plugs 67, thus mounted, are electrically connected in series across a suitable electrical supply 69 which is capable of impressing a high voltage, typically on the order of 70,000 volts, across serially interconnected spark plugs 67 at any desired instant in time.

Mixing unit 70 comprises two nozzle sections 72 and 73. Nozzle section 72 fits within chamber 74 in nozzle section 73 and forms an orifice 75 of adjustable size. Orifice 75 can be varied in size by the depth section 72 is screwed into chamber 74. Inlet 76 is for the introduction of fuel gas and hydrogen and inlet 77 is for the introduction of oxygen.

In operation gas exploder 10 is located at a suitable location with bottom 12 resting on the ground at a spot clear of large stones and other undesirable structure. Typically spring 35 is under sufficient compression such that operation of piston 34 does not occur until a pressure within exploder 10 on the order of 30 p.s.i.g. has been reached.

Valved conduits 63, 64 and 71 are then opened to admit fuel gas, e.g. propylene, oxygen and hydrogen until a pressure in exploder 10 on the order of 2 to 3 p.s.i.g. has been achieved. (It will be apparent that a stoichiometric mixture of oxygen and propylene or slight excess of oxygen, are sought and that this is achieved quite simply by introducing the gases such that the partial pressures of each are in proportion to the molar ratio of a stoichiometric mixture, i.e., $4.5:1::O_2:C_3H_6$.) Mixing unit 70 ensures complete mixing of the gases.

With valved conduits 63, 64 and 71 closed, exploder 10 is properly charged and an explosion can be initiated simply by actuating high voltage source 69 at the desired point in time, whereupon high potential is placed across the serial connection of the eight spark plugs 67 at least two active gaps from an electrode 68 to ground or another electrode 68 are nevertheless provided such that combustion of the mixture of gases within exploder 10 is initiated with a resultant explosion occurring substantially simultaneously with energization of plugs 67.

Suitable gas mixtures for use as the explosive charge in my invention include the following:

TABLE

| Fuel Gas | Vol. Percent H₂ based on oxygen | Mol ratio Fuel gas to oxygen |
| --- | --- | --- |
| Methane | 5 | Stoichiometric (1:2). |
|  | 10 | Stoichiometric + 1/10 mol O₂. |
| Propane | 2 | Stoichiometric (1:5). |
|  | 3 | Do. |
|  | 5 | Do. |
|  | 10 | Do. |
|  | 15 | Do. |
|  | 3 | Stoichiometric + ½ mol O₂ (1:5½). |
|  | 5 | Do. |
|  | 5 | Stoichiometric + ½ mol propane (1:3 ⅓). |
| Propylene | 3 | Stoichiometric (1:4.5). |
|  | 5 | Stoichiometric + ½ mol O₂. |
|  | 10 | Do. |
| Ethylene | 5 | Stoichiometric (1:3). |
| Butane | 5 | Stoichiometric (1:6.5). |
|  | 10 | Do. |
|  | 5 | Stoichiometric + ½ mol O₂. |

To illustrate the effectiveness of the introduction of hydrogen into the fuel gas-oxygen charge of the gas exploder, 5% by volume hydrogen, based on the oxygen present, in a mixture of 0.5 cu. ft. oxygen and 0.111 cu. ft. of propane provides 8 B.t.u. of heat whereas the propane supplies 285 B.t.u. of heat so that the heat addition from the hydrogen is small compared to the propane. However, upon firing of this mixture, the amplitude of the pulse determined empirically is about 25% larger than the pulse of a similar mixture omitting the hydrogen. The reaction of the gas exploder chamber and weight supported thereon was reduced by approximately 75%. The propane-oxygen mixture has been tested using as low as 2% by volume hydrogen based on the oxygen present with similar results. Additionally, similar results will be obtained when propylene, methane and butane are substituted for propane as the fuel gas.

I claim:

1. In a method for propagating a seismic wave at the surface of the earth by the explosion of an approximately stoichiometric mixture of a hydrocarbon fuel gas and oxygen in a chamber having a rigid bottom coupled to the ground and a rigid top, the improvement of incorporating in said mixture hydrogen in an amount sufficient to increase the rate of the explosion reaction but insufficient to substantially decrease the heat of said explosion reaction.

2. In a method for propagating a seismic wave at the surface of the earth by the explosion of a mixture of a combustible fuel gas and oxygen in a chamber having a rigid bottom coupled to the ground and a rigid top, the improvement of incorporating in said mixture from about 2% to 15% hydrogen, by volume based on the amount of oxygen present.

3. The method of claim 2 wherein said fuel gas and oxygen are present in approximately stoichiometric amounts.

4. The method of claim 2 wherein said amount is from about 3% to 10% based on the oxygen present.

5. The method of claim 1 wherein said fuel gas is propane.

6. The method of claim 2 wherein said fuel gas is propane.

7. The method of claim 6 wherein said amount is from about 3% to 10% based on the oxygen present.

References Cited

UNITED STATES PATENTS

| 1,936,156 | 11/1933 | Florez | 48—199 |
| 2,353,484 | 7/1944 | Merten et al. | 181—.5 |
| 2,811,431 | 10/1957 | Zwicky et al. | 149—1 |
| 2,994,397 | 8/1961 | Huckabay | 181—.5 |
| 3,198,282 | 8/1965 | Dunaway | 181—.5 |

BENJAMIN A. BORCHELT, *Primary Examiner.*

SAMUEL FEINBERG, *Examiner.*

G. H. GLANZMAN, *Assistant Examiner.*